Jan. 1, 1929.                                              1,697,568
H. KORN
SYSTEM FOR SIMULTANEOUSLY REGULATING PRIME MOVERS AND GENERATORS
Filed June 15, 1927
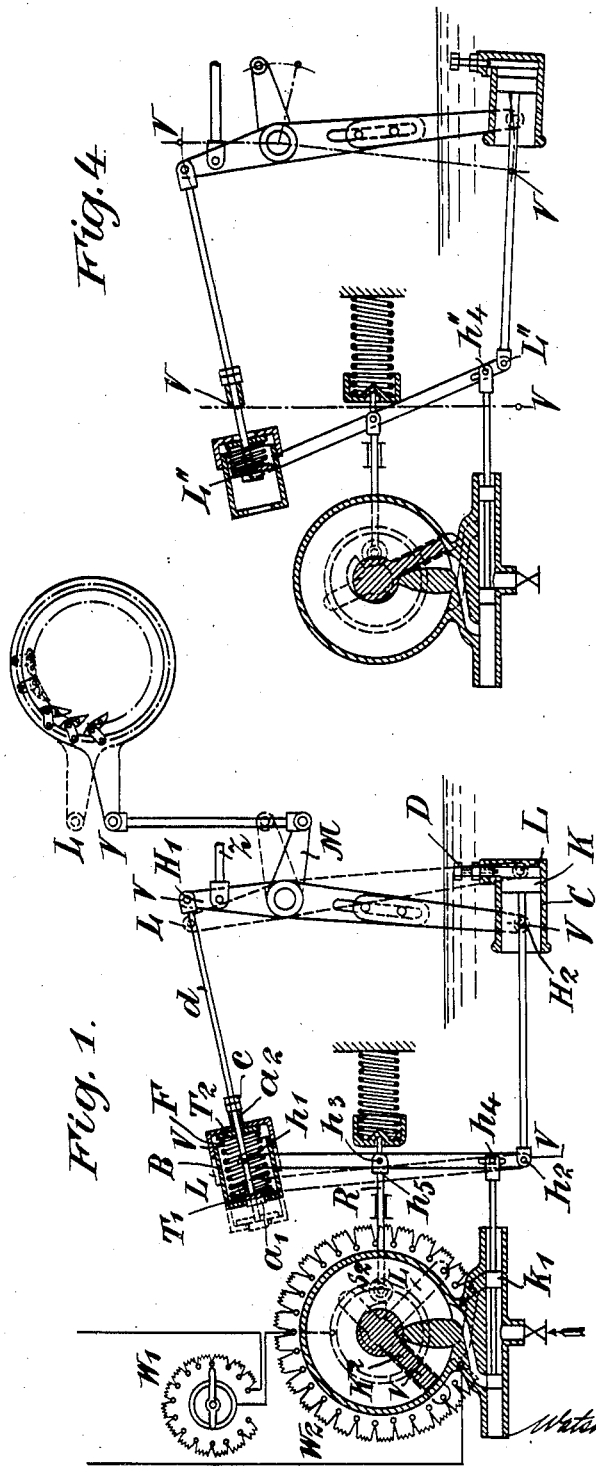
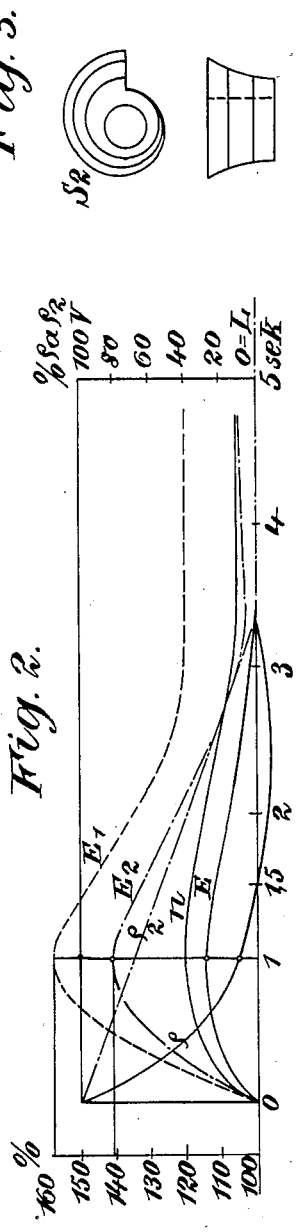
Inventor
Hugo Korn.
by
Attorney.

Patented Jan. 1, 1929.

1,697,568

UNITED STATES PATENT OFFICE.

HUGO KORN, OF ELBING, GERMANY.

SYSTEM FOR SIMULTANEOUSLY REGULATING PRIME MOVERS AND GENERATORS.

Application filed June 15, 1927, Serial No. 199,081, and in Germany December 31, 1925.

My invention relates to improvements in systems for simultaneously regulating prime movers, such as water impelled turbines, and generators, such as electric current generators, and more particularly in systems of the class in which a relay is provided for regulating the generator the movement of which is started from the tachometer sleeve or from the motor regulating mechanism, and the regulating movement of which is independent of or different from the time of the regulating operation of the motor regulating mechanism, the said regulating mechanism being either mechanical or hydraulic. The object of the improvements is to provide a system of the class referred to in which the movement of the regulating device for the field excitation is at first in advance of the movement of the motor regulation, and thereafter retarded relatively thereto, the said movement of the regulation of the field excitation being no longer independent of the motor regulation, but depending thereon according to a definite law. The purpose of the lead in the operation of the field regulation appears from the following considerations:

1. The variation of a magnetic field, that is the increasing or reducing of the intensity thereof, is retarded and reduced by the magnetic inertia. For example when operating a three phase-generator at a certain number of revolutions and with a certain voltage of the net and with no load, and taking a note of the resistance of the field energizing apparatus, thereafter putting the full load V on the generator and again reducing the load to zero while simultaneously setting the said resistance of the field energizing apparatus on the same contact on which it was set when starting the generator under no load, it will be found that the voltage is considerably increased as compared to the voltage developed when starting the generator. If now the field energizing current is only temporarily weakened and thereafter the resistance of the field regulating apparatus is again set on the same contact, the initial voltage is again developed.

When suddenly reducing the load of the said generator from full load to no load L without first regulating the field energizing apparatus, the voltage developed by the generator is considerably increased, for the following two reasons:

2. First, the number of revolutions of the generator the load of which is being reduced necessarily rises until the motor, for example a turbine, has set its regulating apparatus into the position corresponding to operation of the generator under no load and under voltage. The power developed in excess during the motor regulation must be taken up by the rotary masses of the system thus increasing the number of revolutions thereof. When the field energizing current supplied by an energizing generator having a substantially equal number of revolutions D is not regulated, the voltage produced by the generator is $$E = E\left(\frac{n_1}{n}\right)^2,$$

if $E$ is the voltage and $n$ the number of revolutions prior to the reduction of the load, and $E_1$ the voltage and $n_1$ the number of revolutions after the reduction of the load.

3. When leaving the field and the number of revolutions unaltered, and reducing the current intensity of the net from full load to zero, the voltage of the threephase-generator is increased at the rate of from 6 to 20% according to the power factor cos $\varphi$.

One of the problems of the present invention is the reduction of the maximum of the voltage developed. The other problem is to regulate the system so that the voltage at the end of the regulating operation is correct in view of the considerations referred to above under heading 1.

In the accompanying drawing I have illustrated an example embodying my invention. In the said drawing, Fig. 1 is a diagrammatical elevation partly in section showing my improved regulating system, Fig. 2, is a diagram, and Fig. 3, is a detail view showing a part of the system illustrated in Fig. 1.

Fig. 4 is an elevation partly in section of a portion of the device shown in Fig. 1 with the parts in a different position.

In the example shown in Fig. 1 my improved regulating system comprises a rockingly mounted lever having a short arm $H_1$ and a long arm $H_2$, the latter being longitudinally adjustable as shown in Figs. 1 and 4. To the short arm $H_1$ of the said lever a rod $d$ having two abutments $a_1$ and $a_2$ is jointed, which abutments bear on disks $T_1$ and $T_2$ acted upon by a spring $F$ having a certain initial tension and enclosed within a casing B. To the end of the longer arm $H_2$ of the lever an oil cylinder C is jointed, which encloses a piston K. At the rear of the said piston the cylinder C is formed with a port controlled by a screw D. By more or less screwing down the said screw the velocity of the movement of the piston K is regulated. It may be assumed that the screw D is set so that the velocity of the piston K is on an average one tenth of the velocity of the end $H_2$ of the lever. A lever $h_1$, $h_2$ connects the rod of the piston K with the casing B of the spring F. At $h$, a controlling piston $K_1$ is connected to the arm $h_2$, the said piston having the function to control the supply of oil to a piston $K_2$. In the example shown in the figure a rotary piston $K_2$ is provided. But I wish it to be understood that I do not limit myself to this feature, and that an ordinary piston movable within a cylinder having a rectilinear axis may be provided, and that in lieu of the said piston a toothed gearing or another fluid operated gearing may be provided. By the movement of the piston or the fluid operated mechanism and a cam $S_2$ a returning mechanism R is operated, by means of which the position of the fulcrum $h_3$ of the lever $h_1$, $h_2$ can be varied. The resistance of the field coil is so connected to the resistance $W_1$ provided at the switch board that by means of the resistance $W_1$ the voltage of the generator developed under no load can be regulated or varied, while the resistance $W_2$ is automatically varied so that for each load of the generator the desired voltage and, in case of three phase-generators, the desired value of cos $\varphi$ is obtained.

Now I shall describe the operation of the regulating system when reducing the load of the generator from full load V to no load L:

The lever $H_1$, $H_2$ is connected either by the shaft M with the motor regulating apparatus, or by a link Z with the sleeve of the tachometer. When moving the end of the lever $H_2$ within the time of the regulation $t_s$ from V to L, the piston K is moved, with the aforesaid position of the screw D, through $\frac{9}{10}$ of the said path, thus shifting the point $h_4$ from V to $L_1$, the point $h_3$ being temporarily the fulcrum of the lever $h_1$, $h_2$. Thereby the displacement of the casing B of the spring F is larger than that imparted to the abutments $a_1$ and $a_2$ by the arm $H_1$, and the spring is compressed, and the casing B is removed from the disk $T_1$. The piston valve $K_1$ opens the controlling ports to a great extent, and the piston $K_2$ is moved at high velocity moving the contact arm of the resistance from full load to no load and, as will be explained hereafter, beyond the said no-load position. This position of the parts is disclosed in Fig. 4 of the drawing, from which it will be seen that the spring F is compressed, the cylinder C and piston K have operated to shift the valve $K_1$ to the right to admit fluid to the piston $K_2$, and the latter has been moved to its extreme clockwise position. It may be assumed that the supply of oil is such that the piston $K_2$ is moved through its whole stroke within a time $$t_2 = \frac{t_s}{3}.$$

By the movement of $K_2$ and $S_2$ the returning mechanism R and the fulcrum $h_3$ are moved in a direction towards $h_5$ so that the controlling valve $K_1$ approaches the closing or median position, thus partly closing the ports controlled thereby and reducing the velocity of the movement of the piston $K_2$. Further, by the pressure of the spring F the piston K within the cylinder C is moved in the direction towards L, until the disk $T_1$ bears against the left hand head of the casing B. The oil brake C and the spring F provide an isodrom device which heretofore has never been used for controlling the field energizing apparatus by means of the turbine regulator. If desired, the said isodrom device is combined with the returning spring, as is usual in turbine regulation, without departing from this invention.

It will be noted that in Fig. 4 the fulcrum of the lever $h_1$, $h_2$ occupies its extreme left-hand position by reason of the position of the cam $S_2$. When the spring F, acting to move the piston K in the cylinder L, has effected a return of the valve $K_1$, it will be found that this valve occupies a position slightly to the left of the position shown in Fig. 1 by reason of the difference in position of the fulcrum for the lever $h_1$, $h_2$. The piston $K_2$ will therefore rotate through a small angle in a counterclockwise direction. This slight movement will serve to shift the fulcrum of the lever $h_1$, $h_2$ once more to the right by reason of the cam $S_2$, thereby shifting the valve $K_1$ to the position shown in Fig. 1 in which the supply of fluid to the piston $K_2$ is cut off. It will thus be seen that this mechanism serves to obtain the desired result by moving the field rheostat beyond the no-load position, and thereafter returning it to the correct position for no load. In this way, the effect of the magnetic lag and the tendency of the generator and prime mover to retain their original speed is partially counteracted when the load is suddenly removed by reducing the field excitation below the normal amount for a short period of time after the load is reduced.

An important feature of the invention resides in providing a spring F having a certain initial tension, so that the spring has sufficient power until the disk $T_1$ has been placed on the left hand head of the casing B.

The invention will be best understood from the diagram shown in Fig. 2, the said diagram showing the different operations with relation to the time. On the axis of abscissæ time has been marked in seconds. The line $n$ shows the variation of the number of revolutions. On the axis of ordinates the voltages $E_1$, $E_2$ and E and the number of revolutions $n$ have been marked in per cents. The scale marks at the right of the diagram represent per cents of the variation of the regulating resistance.

For clearness sake it will be assumed that when suddenly reducing the load from full load to zero there is a maximum temporary increase of the number of revolutions of 20%, and a lasting increase of the number of revolutions of 5%. Of course, the said values can be very different according to the character of the system. The dotted line indicated by the letter $E_1$ represents the variation of the voltage produced when the regulating resistance of the field coil is not varied, the line $E_2$ drawn in dashes and dots represents the variation of the voltage produced when using the system referred to in the first paragraph of this specification, and the curve E drawn in full lines represents the variation of the voltage produced when using my improved system.

When considering the curves the laws referred to above under headings 1, 2 and 3 must be borne in mind. According to the law stated under heading 2, with a maximum of the number of revolutions the voltage would rise to $$E_1 = E\left(\frac{n_1}{n}\right)^2 = E\left(\frac{1 \cdot 2n}{n}\right)^2 = 1 \cdot 44\ E;$$

the law stated under heading 3 results in an increase of 10%, so that the voltage resulting from the laws stated under headings 2 and 3 is $$E_1 = E \cdot 1.2^2 \cdot 1.1 = 1.58 \cdot E,$$

in continuous operation and with an increase of the number of revolutions of 5%, the voltage rises to $$E_1 = E \cdot 1.05^2 \cdot 1.1,$$

that is to 1.21 times that of the voltage E. By the beginning of the regulation of the field winding, the curve $E^2$ rises only to 1.4 times the normal voltage, and at the end of the regulating operation there remains only the increase of the voltage which results from the consideration made under heading 1.

In my improved system the regulation of the voltage is increased at the begining, the said increase being continued to the maximum of the number of revolutions $n$, and being three times that of the velocity used before. Therefore, the increase of the voltage is only one third of that of the voltage $E_2$. The acceleration may be increased or reduced as may be desirable. From the maximum of the number of revolutions to the end of the regulating operation the effect of the isodrom device included in the voltage regulation in the form of the cylinder C and the spring F is made use of. Therefore the curves are elongated and smooth. However, the isodrom time of the cylinder C can be set on a larger value than the isodrom time of the regulator. Therefore an excessive regulation of any desired degree is brought about, which is indicated by the deep bend of the $\varphi$-curve. Thereby the voltage is brought to the initial value.

It may be added that the system may be set on increasing voltage according to increasing load for compensating the loss in the leads of the net.

When the operating arms $H_1$ and $H_2$ from the tachometer sleeve, similar movements are produced, so that it is not necessary to describe this modification. The cam $S_2$ shown in Fig. 3 is provided with a plurality of different cam faces located one beside the other and adapted to be brought into position for cooperation with the returning apparatus. Thereby the system is adapted to different conditions of the field energizing current and the load resulting from different types of generators and different conditions of the net. This regulation is effected in practical operation according to the conditions of the plant.

Various operating results can be obtained by adjusting the tension of the spring F, by adjustment of the screw D which controls the movement of the piston K, and by adjusting the longer arm $H_2$ of the operating lever.

I claim:

1. Apparatus for effecting automatic regulation of a generator comprising means for controlling the field excitation of the generator, a device associated with the prime mover for the generator and responsive to a reduction in the generator load, and mechanism connecting said means and said device operable by said device to move said means from normal position at an original load to a position corresponding to less than normal voltage at a reduced load, and thereafter to normal position at reduced load.

2. Apparatus for effecting automatic regulation of a generator comprising means for controlling the field excitation of the generator, and mechanism variable in position in accordance with operating conditions of the prime mover for the generator caused by variations in load and operatively associated with said means for moving the latter from full voltage position to a position corresponding to less than normal voltage at the given speed and thereafter to the normal voltage position.

3. Apparatus for effecting automatic regulation of a generator comprising means for controlling the field excitation of the generator, and mechanism operable on reduction in the generator load to move said means from its normal position at the original load to a position corresponding to less than normal voltage at the reduced load and thereafter to normal voltage position at the reduced load.

4. Apparatus for effecting automatic regulation of a generator comprising means for controlling the field excitation of the generator, and mechanism responsive to variations in the generator load operatively associated with said means to move said means toward and beyond the correct position corresponding to a changed load, and to thereafter return said means to the correct position for said load.

5. In apparatus of the class described, a pair of unequal armed levers pivoted intermediate their ends, connections between the adjacent ends of the levers, one of said connections being resilient, and the other connection including a motion retarding device, said lever arms being so proportioned that movement of one lever serves to move the other lever through the motion retarding device, and said last mentioned lever is thereafter moved in the reverse direction by the action of said resilient connection.

6. Apparatus as set forth in claim 5 in which one of the lever arms is adjustable in length for varying the relative movement of said levers.

7. In apparatus of the class described, an operating lever, a lever driven thereby, said levers being pivoted intermediate their ends and having unequal arms, connections between the adjacent arms of said levers, one of said connections being resilient, and the other connection including a motion retarding device, said lever arms being so proportioned that movement of said operating lever serves to move said driven lever through the motion retarding device and said driven lever is thereafter moved in the reverse direction by the action of said resilient connection, and means for shifting the fulcrum of said driven lever operable by the movement thereof.

In testimony whereof I hereunto affix my signature.

HUGO KORN.